US012075191B1

(12) United States Patent
Springer (10) Patent No.: US 12,075,191 B1
(45) Date of Patent: Aug. 27, 2024

(54) TRANSPARENT FRAME UTILIZATION IN VIDEO CONFERENCING

(71) Applicant: Zoom Video Communications, Inc., San Jose, CA (US)

(72) Inventor: Shane Paul Springer, Oregon City, OR (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 18/297,774

(22) Filed: Apr. 10, 2023

Related U.S. Application Data (63) Continuation of application No. 17/515,481, filed on Oct. 31, 2021, now abandoned.

(51) Int. Cl.
| | |
|---|---|
| *H04N 7/15* | (2006.01) |
| *G06F 3/01* | (2006.01) |
| *H04N 7/01* | (2006.01) |
| *H04S 7/00* | (2006.01) |

(52) U.S. Cl.
CPC .............. *H04N 7/15* (2013.01); *G06F 3/013* (2013.01); *H04N 7/0135* (2013.01); *H04S 7/30* (2013.01); *H04S 2400/11* (2013.01); *H04S 2400/15* (2013.01)

(58) Field of Classification Search
CPC .......... H04N 7/15; H04N 7/01; H04N 7/0135; H04N 7/155; H04N 7/144; H04N 7/147; H04N 19/23; H04S 7/00; H04S 7/30; H04S 2400/11; H04S 2400/15; G06F 3/01; G06F 3/013; G06F 3/04845; G06T 7/194

USPC .......................................... 348/14.01–14.16
See application file for complete search history.

(56) References Cited

U.S. PATENT DOCUMENTS

| | | | |
|---|---|---|---|
| 7,042,486 B2 | 5/2006 | Manico et al. | |
| 2014/0354759 A1* | 12/2014 | Cranfill | H04N 23/617 |
| | | | 348/14.1 |
| 2014/0362172 A1* | 12/2014 | Tan | H04N 5/265 |
| | | | 348/511 |
| 2015/0138303 A1* | 5/2015 | White | H04N 7/144 |
| | | | 348/14.07 |
| 2017/0085605 A1* | 3/2017 | Kraemer | H04L 12/1827 |
| 2017/0193644 A1* | 7/2017 | Fry | G06T 7/194 |
| 2019/0253667 A1* | 8/2019 | Valli | H04N 7/157 |
| 2019/0306457 A1* | 10/2019 | Liu | H04N 7/144 |

FOREIGN PATENT DOCUMENTS

| | | | | |
|---|---|---|---|---|
| WO | WO-2015134422 A1 * | 9/2015 | ....... | G06F 17/30017 |
| WO | 2022013540 A1 | 1/2022 | | |

* cited by examiner

*Primary Examiner* — Yogeshkumar Patel
(74) *Attorney, Agent, or Firm* — Young Basile Hanlon & MacFarlane, P.C.

(57) ABSTRACT

Transparent frames are utilized in a video conferencing session. The transparent frames are used in conjunction with transparent screens and cameras positioned behind the transparent screens. Streamed videos of one or more remote participants are displayed on the transparent screens in every other frame of the video such that the transparent screen alternates between displaying a frame of the remote participant and a transparent frame. Video frames of the one or more participants are captured during the display of the transparent frames. The captured video frames of the participants are displayed at one or more remote screens viewed by the one or more remote participants.

20 Claims, 9 Drawing Sheets

TRANSPARENT FRAME UTILIZATION IN VIDEO CONFERENCING

CROSS-REFERENCE TO RELATED APPLICATION(S)

This application is a continuation of U.S. patent application Ser. No. 17/515,481, filed Oct. 31, 2021, the entire disclosure of which is hereby incorporated by reference.

FIELD

The present application relates generally to digital communication, and more particularly, to systems and methods for providing a representation of natural eye contact between participants within a video conferencing session.

SUMMARY

The appended claims may serve as a summary of this application.

BRIEF DESCRIPTION OF THE DRAWINGS

The present application relates generally to digital communication, and more particularly, to systems and methods providing for dynamic alteration of notification preferences within a video communication platform.

The present disclosure will become better understood from the detailed description and the drawings, wherein.

DETAILED DESCRIPTION OF THE DRAWINGS

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Today's physically-located video conference spaces—which may be, for example, a conference room within an office, school, or library—are struggling with two large challenges. First, participants outside of the physical conference space (hereinafter "physical space")—report feeling disconnected when this space is merely broadcast as an isolated feed on a screen shared with other isolated feeds, with mixed audio from all the feeds streamed for playback. Second, participants report that looking at a remote speaker on a screen in the conference room prevents eye contact that is natural, i.e., eye contact that can be directed towards individuals as though it is direct, natural eye contact from one person to another in physical space.

Thus, there is a need in the field of digital communication tools and platforms to create new and useful systems and methods for providing a representation of natural eye contact within a remote video conferencing session. As participants communicate within a video conference space with one another and with remote participants, the system is configured to represent different remote participants on different transparent video screens, such that single video frames of a remote participant alternate with transparent frames. The screen interpolates between transparent frames and frames with participants at a high refresh rate (for example, 120 hertz or higher), such that any participant viewing the screen perceives only the remote participant's frames. A camera is positioned behind each transparent video screen, and captures a video frame of the participant while the transparent video screen is displaying the transparent video frame. These video frames are then transmitted to a remote server hosting the remote video conferencing session, such that remote video participants can view the participants with perceived eye contact on their own screens. If both the conference space and the remote conference space are configured in such a setup, then each space can display video of remote participants with a provided representation of natural eye contact for each of those participants. In some embodiments, spatial audio is additionally provided to complete the representation of participants appearing to view and hear remote participants as if in person, with convincing representations of shared physical space between participants and remote participants.

In various embodiments, such configurations may include one or more of: transparent video screen(s) (e.g., transparent OLED displays) which, according to the embodiments herein, can simulate a person communicating with other people inside of that person's physical space; spatial audio, via cameras and/or microphones capturing audio of participants, that is configured to correctly place these individuals in the room for focused listening with spatialized separation between participant voices; and camera equipment configured to capture video frames of individuals maintaining eye contact with the transparent video screens without interrupting the video, to maintain a representation of eye contact with remote participants.

In one embodiment, a method provides, for a physical space, a connection to a remote video conferencing session with one or more remote participants, the physical space including at least one or more transparent video screens, one or more cameras each positioned behind a different one of the transparent screens, and one or more participants positioned in front of the transparent screens and cameras. The method then displays, at each of the transparent screens, streamed videos of the one or more remote participants in every other frame of the video such that each screen alternates between displaying a frame of the remote participant and a transparent frame, with each of the one or more transparent screens displaying a different remote participant. The method then captures, via the cameras, video frames of the one or more participants in the physical space during the display of the transparent frames, and transmits the captured video frames of the participants to be displayed at one or more remote screens viewed by the one or more remote participants.

Further areas of applicability of the present disclosure will become apparent from the remainder of the detailed description, the claims, and the drawings. The detailed description and specific examples are intended for illustration only and are not intended to limit the scope of the disclosure.

Figure 1A:
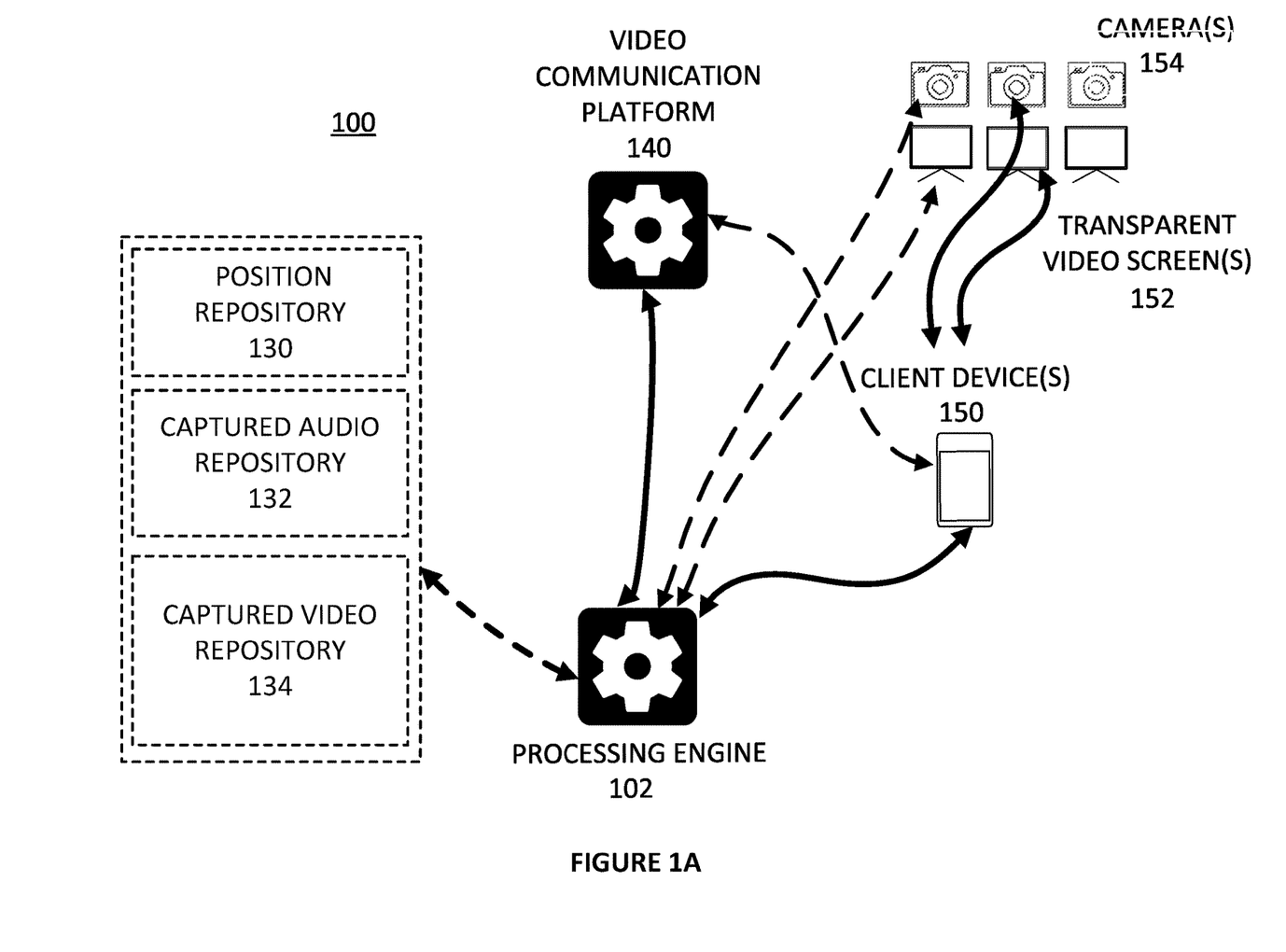
FIG. 1A is a diagram illustrating an exemplary environment in which some embodiments may operate.

FIG. 1A is a diagram illustrating an exemplary environment in which some embodiments may operate. In the exemplary environment 100, a client device 150 is connected to a processing engine 102, a video communication platform 140, one or more transparent video screen(s) 152, and one or more camera(s) 154. The processing engine 102 is connected to the video communication platform 140, and optionally connected to one or more repositories and/or databases, including, e.g., a position repository 130, captured audio repository 132, and/or a captured video repository 134. One or more of the databases may be combined or split into multiple databases. The user's client device 150 in this environment may be a computer, and the video communication platform 140 and processing engine 102 may be applications or software hosted on a computer or multiple computers which are communicatively coupled via remote server or locally.

The exemplary environment 100 is illustrated with only one client device, one processing engine, and one video communication platform, though in practice there may be more or fewer additional client devices, processing engines, and/or video communication platforms. In some embodiments, the client device(s), processing engine, and/or video communication platform may be part of the same computer or device. Any number of transparent video screen(s) and any number of camera(s) may be present.

In an embodiment, the processing engine 102 may perform the exemplary method of FIG. 2 or other method herein and, as a result, provide indication of non-verbal cues within a video communication platform. In some embodiments, this may be accomplished via communication with the client device, processing engine, video communication platform, transparent video screen(s), camera(s), and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or video communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the client device 150. In some embodiments, one or more of the video communication platform 140, processing engine 102, client device 150, transparent video screen(s) 152, and camera(s) 154 may be part of the same device. In some embodiments, the user's client device 150 is associated with a first user account within a video communication platform, and one or more additional client device(s) may be associated with additional user account(s) within the video communication platform.

One or more transparent video screen(s) 152 are connected to the client device(s) 150 and/or optionally the processing engine 102. In some embodiments, the transparent video screen(s) may be transparent OLED, transparent AMOLED, or other screens which allow for a transparent, see-through viewing experience for pixels which are turned off. In some embodiments, the transparent video screen(s) display a refresh rate such that alternating, interpolated video frames are visually indistinguishable to a person viewing the screen within the room. In some embodiments, one or more of the transparent video screens can connect, via a remote server, to the video communication platform and/or processing engine and can be associated with one or more user accounts on a video communication platform.

One or more camera(s) 154 are additionally connected to the client device(s) 150 and/or optionally the processing engine 102. In some embodiments, this camera is capable of capturing and transmitting video content and individual video frames of participants in the room in real time or substantially real time. The cameras are positioned directly behind the transparent video screens, such that they are configured to capture the direct gaze of participants as they maintain eye contact with the transparent video screens. In some embodiments, the cameras may also capture audio recordings of participants. In one example, one or more endpoint devices may be smartphones with built-in cameras and microphones, and the smartphone operating software or applications may provide the ability to broadcast live streams based on the video and audio generated by the built-in cameras. In some embodiments, one or more of the cameras can connect, via a remote server, to the video communication platform and/or processing engine and can be associated with one or more user accounts on a video communication platform.

In some embodiments, optional repositories can include one or more of a position repository 130, captured audio repository 132, and/or captured audio repository 134. The optional repositories function to store and/or maintain, respectively, information about the identified positions of participants and/or transparent video screens within a video conference space; audio from participants captured during the video communication session; and video or video frames of participants captured during the video communication session. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

Video communication platform 140 is a platform configured to facilitate meetings, presentations (e.g., video presentations) and/or any other communication between two or more parties, such as within, e.g., a video conference or virtual classroom. A video communication session within the video communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
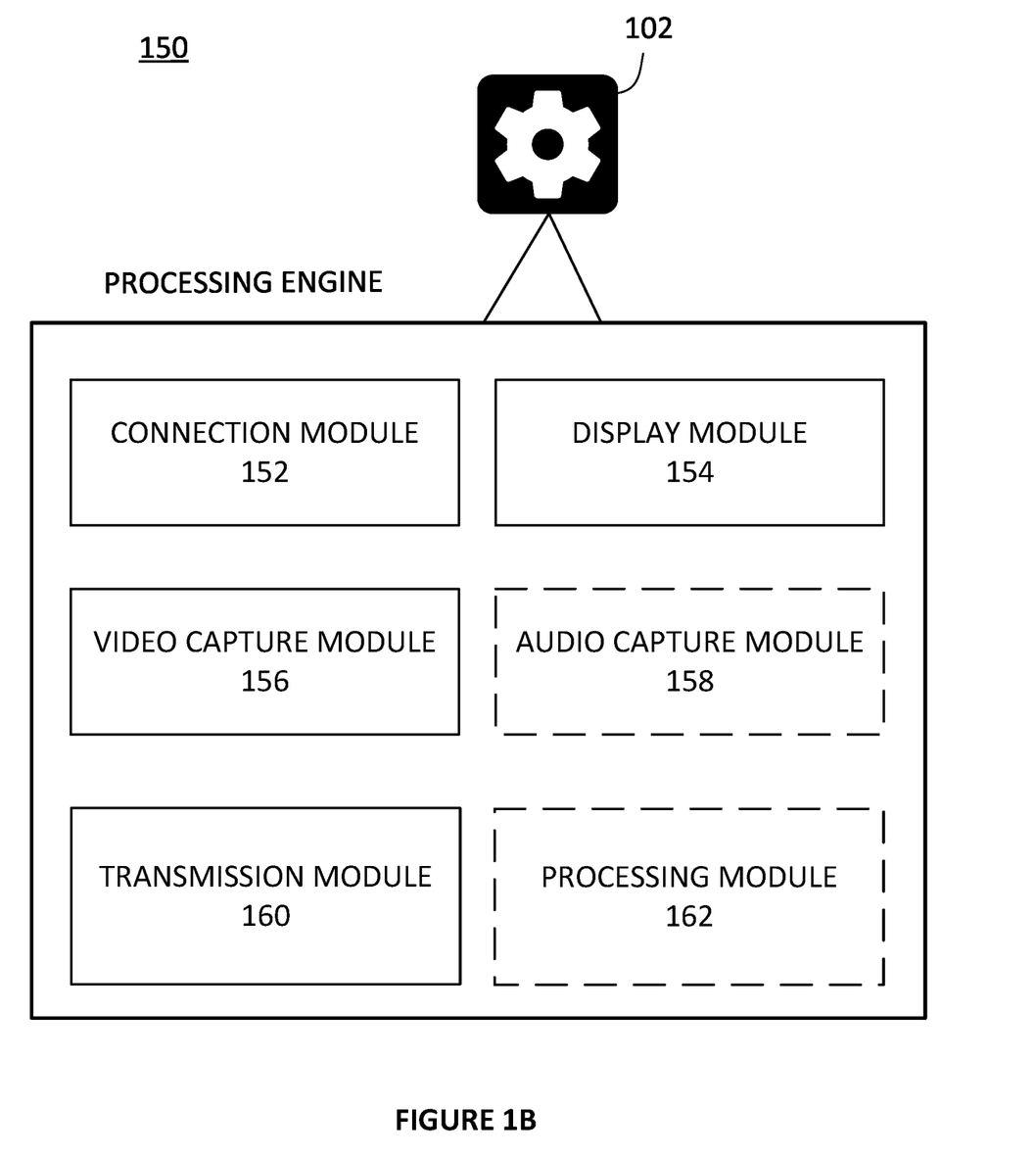
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to provide a connection within a physical conference space to a remote video conference session with one or more remote participants.

Display module 154 functions to display, at each of the transparent video screens, streamed videos of the one or more remote participants in every other frame of the video such that each screen alternates between displaying a frame of the remote participant and a transparent frame, with each of the one or more transparent screens displaying a different remote participant.

Video capture module 156 functions to capture, via the camera(s), video frames of the one or more participants in the physical space during the display of the transparent frames.

Transmission module 160 functions to transmit the captured video frames of the participants to be displayed at one or more remote screens viewed by the one or more remote participants.

Optional processing module 162 functions to process audio recordings for spatial positioning in a generated audio mix and/or to process video frames to optimize for spatial video and/or remote real-time streaming playback.

The above modules and their functions will be described in further detail in relation to an exemplary method below.

Figure 2A:
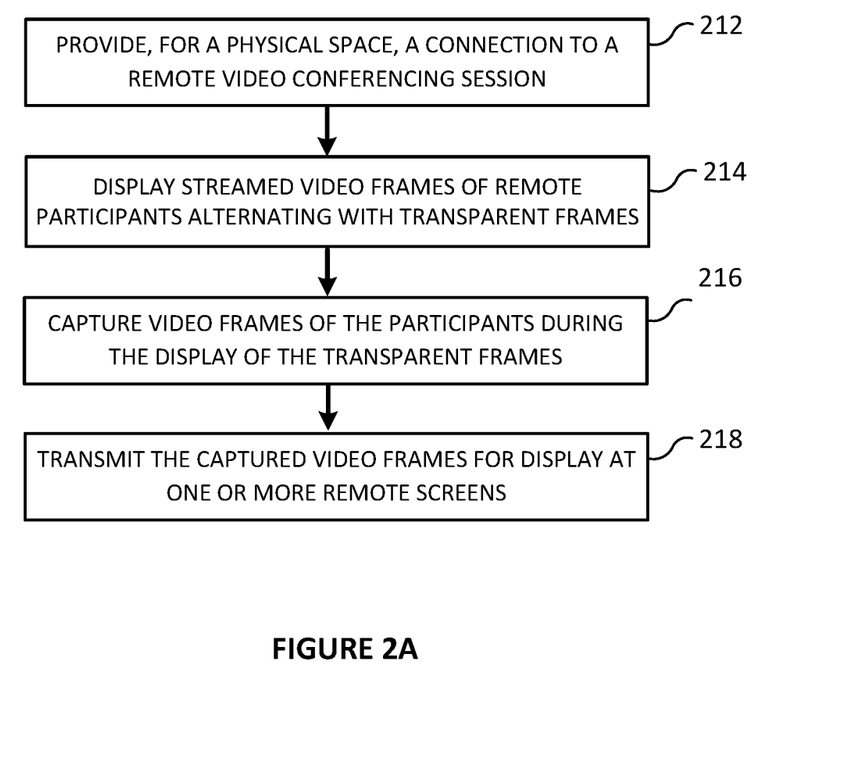
FIG. 2A is a flow chart illustrating an exemplary method that may be performed in some embodiments.

FIG. 2A is a flow chart illustrating an exemplary method that may be performed in some embodiments.

At step 212, the system provides, for a physical space, a connection to a remote video conferencing session with one or more remote participants. The physical space can be, e.g., a physical conference room or other physical space for video conferencing. The physical space includes at least one or more transparent video screens, one or more cameras each positioned behind a different one of the transparent screens, and one or more participants positioned in front of the transparent screens and cameras. Transparent video screens and cameras are described above with respect to FIG. 1A. Example embodiments and further descriptions of the physical space and its potential various configurations and equipment will be discussed below with respect to FIG. 3, FIG. 4, FIG. 5A, and FIG. 5B.

In some embodiments, the system connects participants to a live communication stream via one or more client devices. The communication stream may be any video conferencing "session" (such as, for example, an instance of a work team video conference, webinar, informal chat session, or any other suitable session) initiated and hosted via the video communication platform, for remotely communicating with one or more users of the video communication platform, i.e., remote participants within the video communication session. Participants are connected via one or more client devices, and are associated with user accounts within the communication platform.

At step 214, the system displays, at each of the one or more transparent screens, streamed videos of the one or more remote participants in every other frame of the video such that each screen alternates between displaying a frame of the remote participant and a transparent frame, with each of the one or more transparent screens displaying a different remote participant. In some embodiments, the system receives a number of video feeds depicting imagery of a number of remote participants, the video feeds each having multiple video frames. In some embodiments, the video feeds are each captured via an external device, such as, e.g., a video camera or a smartphone with a built-in video camera, and then the video content is transmitted to the system. In some embodiments, the video content is generated within the system, such as on a participant's client device. For example, a participant may be using her smartphone to record video of herself giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system. The system then displays these video frames at the transparent video screens.

In some embodiments, the video frames are processed prior to being received. The processing includes removing a background within the frame behind a detected participant, and replacing the background with a transparent image via an alpha channel (i.e., a mask in which the black area acts as a transparent area). After replacing the background image with the transparent image, the frame can be sent on to be received by the system. In some embodiments, video is processed in larger segments or as a whole, rather than frame by frame, to replace the background with a transparent image. In some embodiments, a remote server performs the processing for this replacement.

In some embodiments with multiple transparent video screens, each of the transparent video screens is configured to display video frames relating to only one of the remote participants from the video conferencing session. Individual participants can thus be separated out into multiple different video screens. Participants will then naturally turn their head to one of the remote participants when speaking to them. In some embodiments, spatial audio represents each remote participant's voice as though it is coming from the transparent video display depicting that remote participant, since that remote participant's captured audio is spatially positioned within an audio mix to correspond to the transparent video display's known position.

At step 216, the system captures, via the one or more cameras, video frames of the one or more participants in the physical space during the display of the transparent frames. In some embodiments, the cameras are configured to capture individual frames of one or more participants every other frame. In other embodiments, the cameras are configured to capture full video of one or more participants, then filter out frames in which a clear view of the participants is not achieved. Since the transparent video screen displays a remote participant every two frames, then the cameras may filter out the frames in which the remote participant is displayed, since a clear view of the participants being captured cannot be achieved. In some embodiments, only one participant is captured per camera, while in other embodiments, multiple participants are captured within any single camera shot.

At step 218, the system transmits the captured video frames of the participants to be displayed at one or more remote screens viewed by the one or more remote participants. In some embodiments, prior to transmitting the captured video frames, they are processed to optimize for remote, real-time streaming playback. That is, in some cases the video frames may be compressed or otherwise optimized or modified to lower the file size which is to be transmitted, thus allowing for faster and more efficient transfer of frames. Real-time streaming of participant video on both ends of the remote video conferencing session is essential for a video conferencing experience free of latency or delayed video. In some embodiments, the system transmits the captured video frames of the participants in a way that provides interpolated frames with another set of videos or with transparent frames.

Figure 2B:
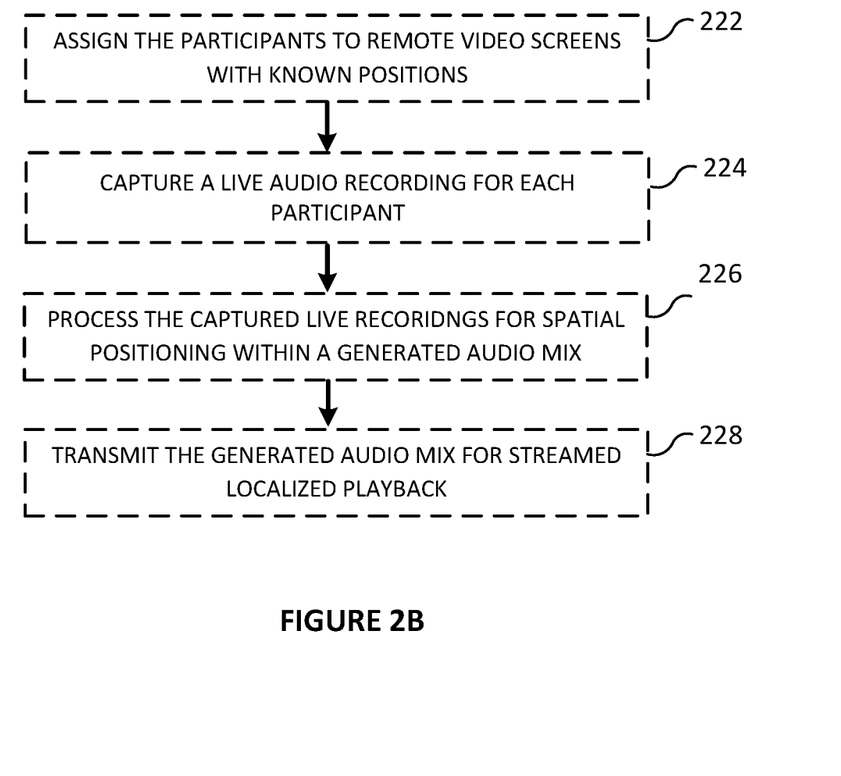
FIG. 2B is a flow chart illustrating an optional additional method that may be performed in some embodiments.

FIG. 2B is a flow chart illustrating an optional additional method that may be performed in some embodiments. In particular, this additional method relates to providing spatial audio in addition to the visual representation of eye contact that is provided by the method of FIG. 2A. Spatial audio may be considered to be any audio which gives the listener a sense of space which allows the listener to pinpoint where a particular sound is coming from, whether this is above, below, at some position in the left channel, right channel, or a full 360 degrees around the listener. While stereo allows for stereo panning and positioning of sounds between a left and right channel, other technologies can give the listener a sense of an exact, three-dimensional location of sound sources from all around the listener. This may be particularly useful in the context of a video conferencing session, since if a participant is placed in a specific location within a transparent video screen in the physical space, the audio associated with that participant can similarly be positioned in that same specific location in the sound space. In some embodiments, the processing is done partly at a remote server and partly at a local machine. In some embodiments, a local machine would generate a number of audio streams, each representing one channel, and spread the streams to all available speakers or other audio outputs.

In some embodiments, the system first identifies a position of each of the participants within the physical space. In some embodiments, the system identifies the position of the participants by receiving the position from one or more connected devices with geolocational functionality, such as a smartphone carried by the participant. In some embodiments, machine vision techniques may be employed to ascertain an approximate or precise location of each participant within the room based on one or more cameras capturing video of those participants.

At optional step 222, the system assigns each of the participants within the physical space to a remote video screen with a known position located in a remote physical space associated with the remote participants. In some embodiments, the system may map an identified position of the participant to the closest known position of a remote video screen at the remote physical space. In some embodiments, the system may assign a participant to a remote video screen based on the participant's position in the physical space relative to other participants. In some embodiments, the system may assign participants to a remote video screen arbitrarily or based on some other suitable metric.

At optional step 224, the system captures a separate live audio recording of each of the participants. The live audio recording is captured in real time or substantially real time to be transmitted as part of a live stream in the video conferencing session. In some embodiments, the cameras used for capturing video may additionally be used for capturing the audio of participants. For example, the camera may have on or more embedded microphones which can be used for capturing the audio. In some embodiments, a dedicated microphone may be connected to or in proximity to each camera and/or transparent video screen, which can be used for capturing audio related to one or more participants. In some embodiments, each microphone or other audio capture device is dedicated to capturing the audio of only one participant, in order to capture multiple audio recordings, each of which can be separately positioned within an audio mix.

At optional step 226, the system processes, in real time, each of the captured live audio recordings to be spatially positioned within a generated audio mix based on the positions of the transparent video screens assigned to the corresponding participant. In some embodiments, this processing of the captured live audio utilizes spatial audio techniques. In some embodiments, simple stereo panning within the stereo field of the generated audio mix is employed to achieve stereo positioning of participant audio within the left and right channels of the mix. In some embodiments, the spatial positioning of the captured live audio recordings is optimized for one or more of: stereo, multichannel surround sound, binaural audio, three-dimensional sound, Ambisonics, and/or 360 degree sound.

At optional step 228, the system transmits the generated audio mix to be streamed for playback at the remote video conferencing session such that each of the spatially positioned captured live audio recordings is localized for playback within the corresponding spatial position inside of a remote physical space. In some embodiments, the localization of the playback is handled by the audio system within the remote physical space. For example, if the audio system enables only stereo sound, then a spatialized audio mix may be localized for playback on a stereo speaker system, while if the audio system enables multichannel surround sound, the spatialized audio mix is localized for playback on multiple speakers in a surround sound arrangement. Many different localizations may be performed depending on the sound system configuration within the remote physical space. Such localizations may include one or more of: stereo, multichannel surround sound, binaural audio, three-dimensional sound, Ambisonics, and/or 360 degree sound.

Figure 3:
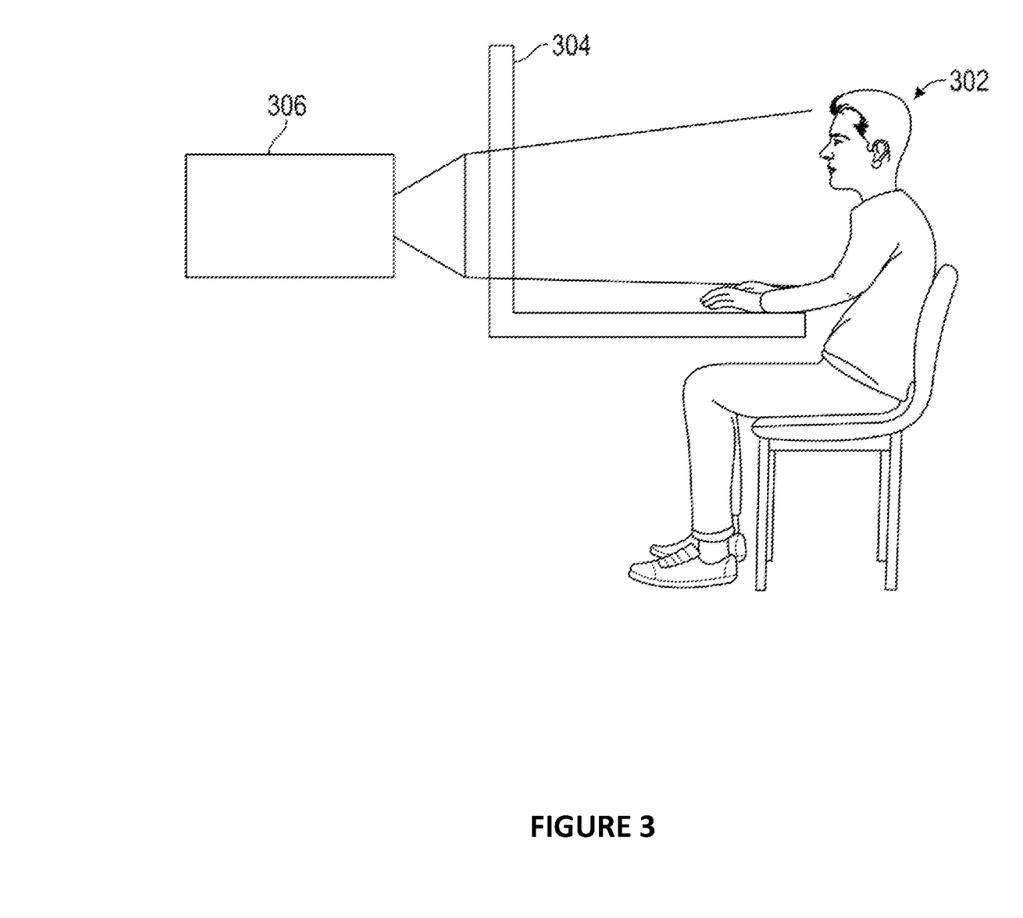
FIG. 3 is a diagram illustrating one example embodiment of a participant seated in a physical space configured for a video conferencing session, according to some embodiments.

FIG. 3 is a diagram illustrating one example embodiment of a participant seated in a physical space configured for a video conferencing session, according to some embodiments.

Within the example embodiment, a participant 302 within a physical space is seated at a desk. A transparent video screen 304 is arranged to be positioned directly in front of the participant 302, in the participant's natural line of sight. A camera 306 is positioned directly behind the transparent video screen 304, and is elevated to be at the optimal height to capture the natural line of sight of the participant. As described above with respect to FIG. 2A, the display is configured to display interpolated, alternating frames of a remote participant and transparent frame. When the frame is transparent, the user sees through the transparent video screen to what is behind the display. However, since the user is focusing on the video of the remote participant, the user's brain will tend to focus only on the alternating frames in which the participant is presented, thus ignoring or not perceiving the transparent frames. During the display of the transparent frames on the transparent video screen 304, the camera 306 captures video frames of the participant 302 at the natural line of sight.

Figure 4:
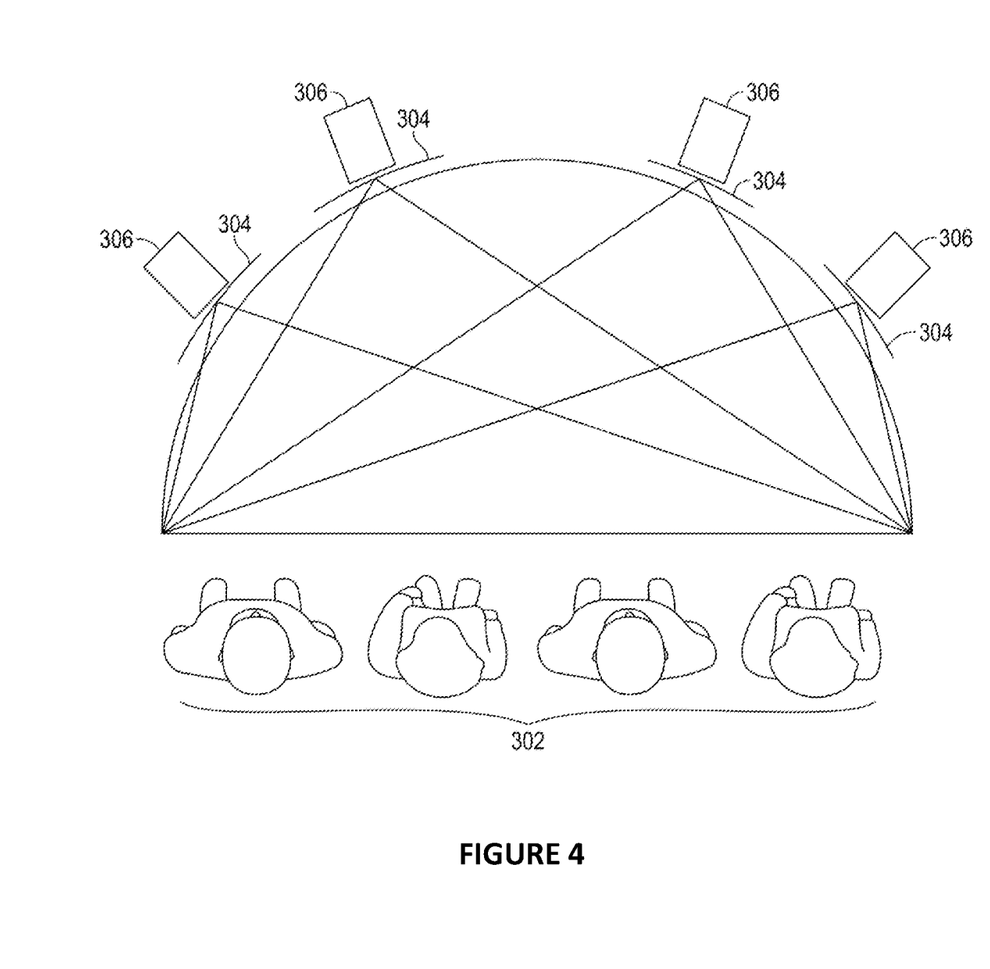
FIG. 4 is a diagram illustrating one example embodiment of a physical space configured for a video conferencing session, according to some embodiments.

FIG. 4 is a diagram illustrating one example embodiment of a physical space configured for a video conferencing session, according to some embodiments.

In the example embodiment, a physical space is illustrated with multiple transparent video screens 304, multiple cameras 306 positioned directly behind the transparent video screens 304, and multiple participants 302. In this embodiment, there are four transparent video screens, four cameras, and four participants. The displays and cameras are all positioned equidistant to one another to cover a full view of the participants within the physical space. The illustrated lines of sights of the cameras show that multiple participants will be visible within each of the four camera's captured video. The perspective of each captured video will be different, however, due to the different position of each camera.

Figure 5A:
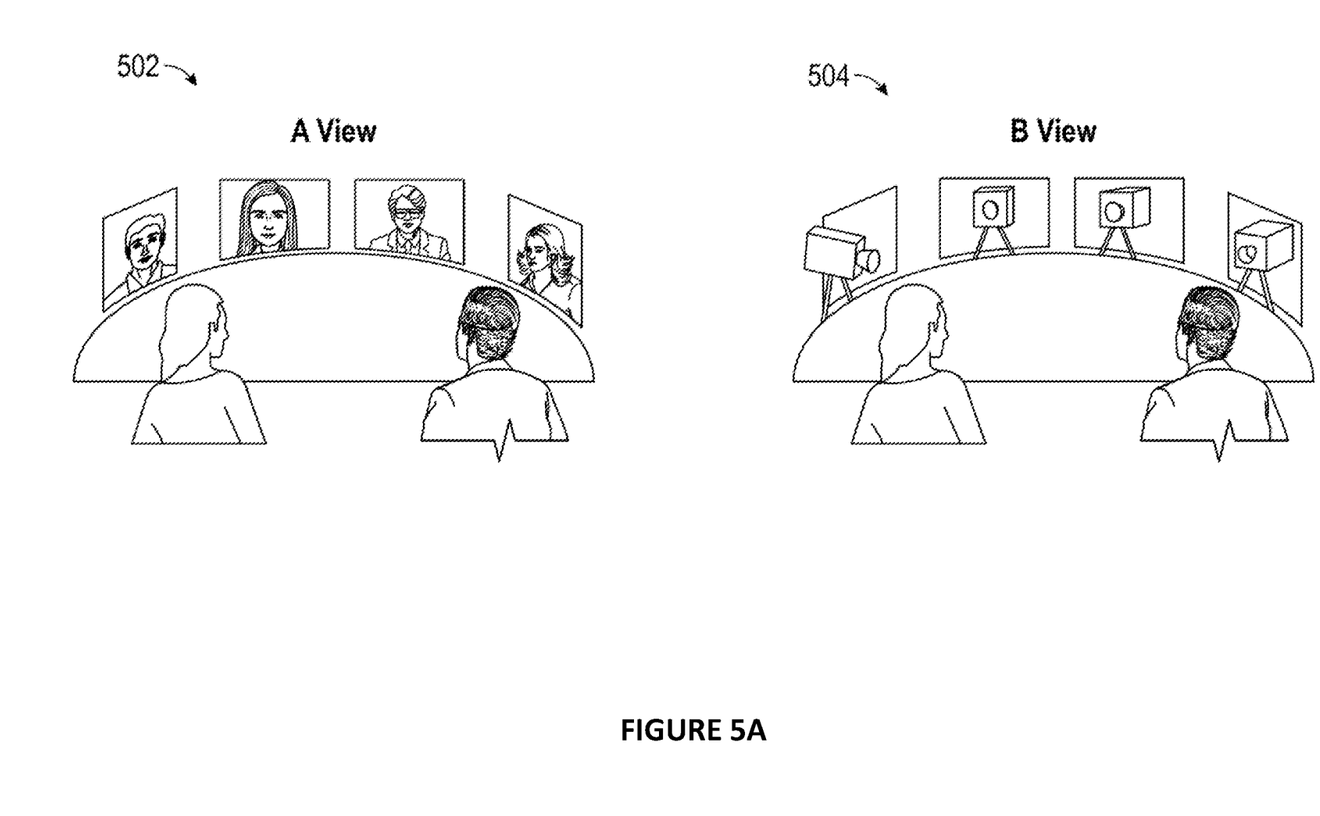
FIG. 5A is a diagram illustrating one example embodiment of alternating frames displayed at transparent video screens, according to some embodiments.

FIG. 5A is a diagram illustrating one example embodiment of alternating frames displayed at transparent video screens, according to some embodiments.

The two views, A view and B view, represent a first frame displayed on transparent video screens, and a second frame displayed on transparent video screens. In the A view, first video frames depicting four different remote participants are displayed on the four transparent video screens. In the B view, a second frame that shows merely a transparent, see-through view is displayed on the transparent video screens. Since the view is completely transparent, the camera behind the screen has a clear view of the participant, and conversely, the participant has a clear view of the camera, although since that view is alternated with video of a remote participant, the participant does not discern the transparent frames which are shown every other frame. As a result, each participant looking at a transparent video screen opposite from them also has their video captured while they are maintaining eye contact with the camera. The A view and B view are alternated between during the length of the video conferencing session.

Figure 5B:
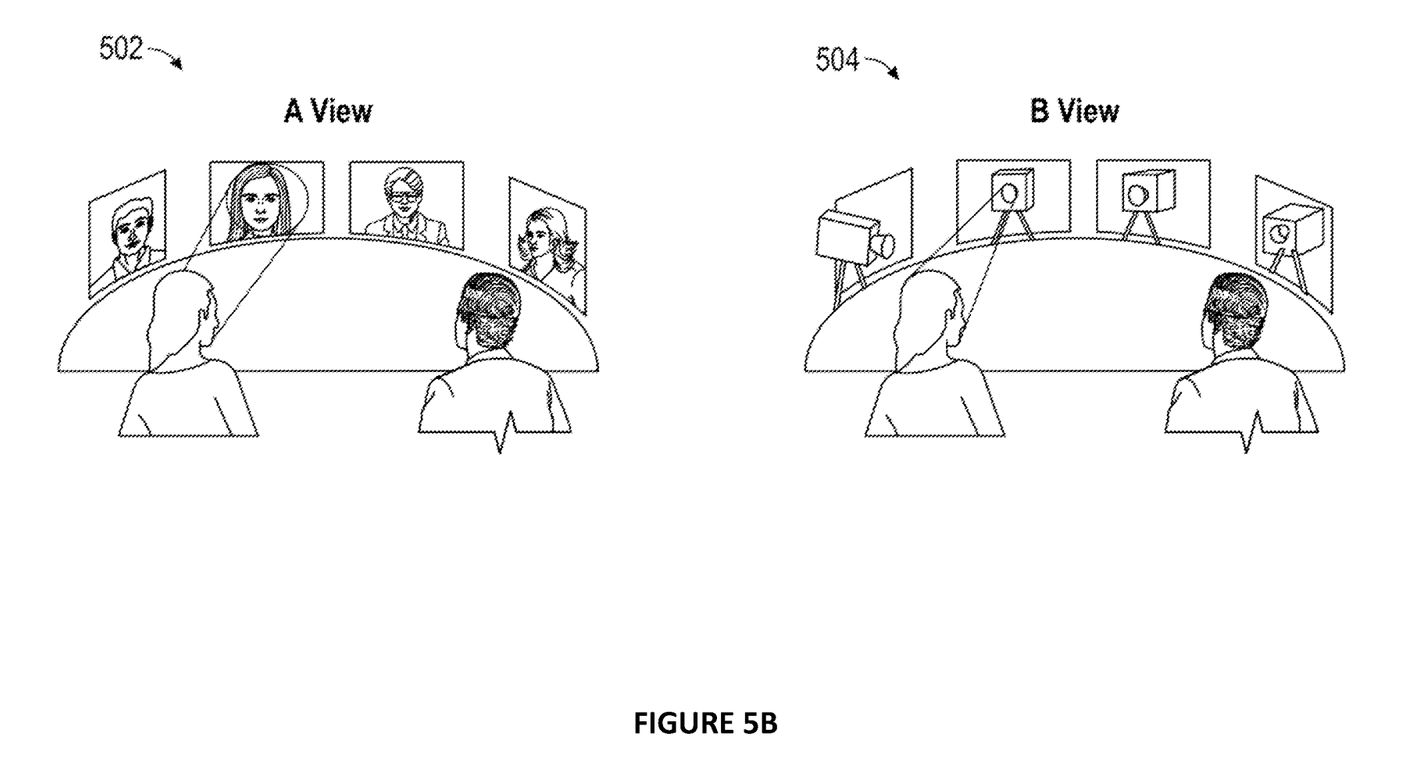
FIG. 5B is a diagram illustrating one example embodiment of alternating frames displayed at transparent video screens, according to some embodiments.

FIG. 5B is a diagram illustrating one example embodiment of alternating frames displayed at transparent video screens, according to some embodiments.

The illustrated embodiment of FIG. 5B is identical to the embodiment of FIG. 5A. The example of a first participant with their line of sight is shown in the A view. The participant's line of sight is directed to a transparent video screen opposite them, which is displaying a remote participant. In the B view, the camera's line of sight is directed at the watching participant as the camera captures a video frame. The A view and B view are alternated between during the length of the video conferencing session.

Figure 6:
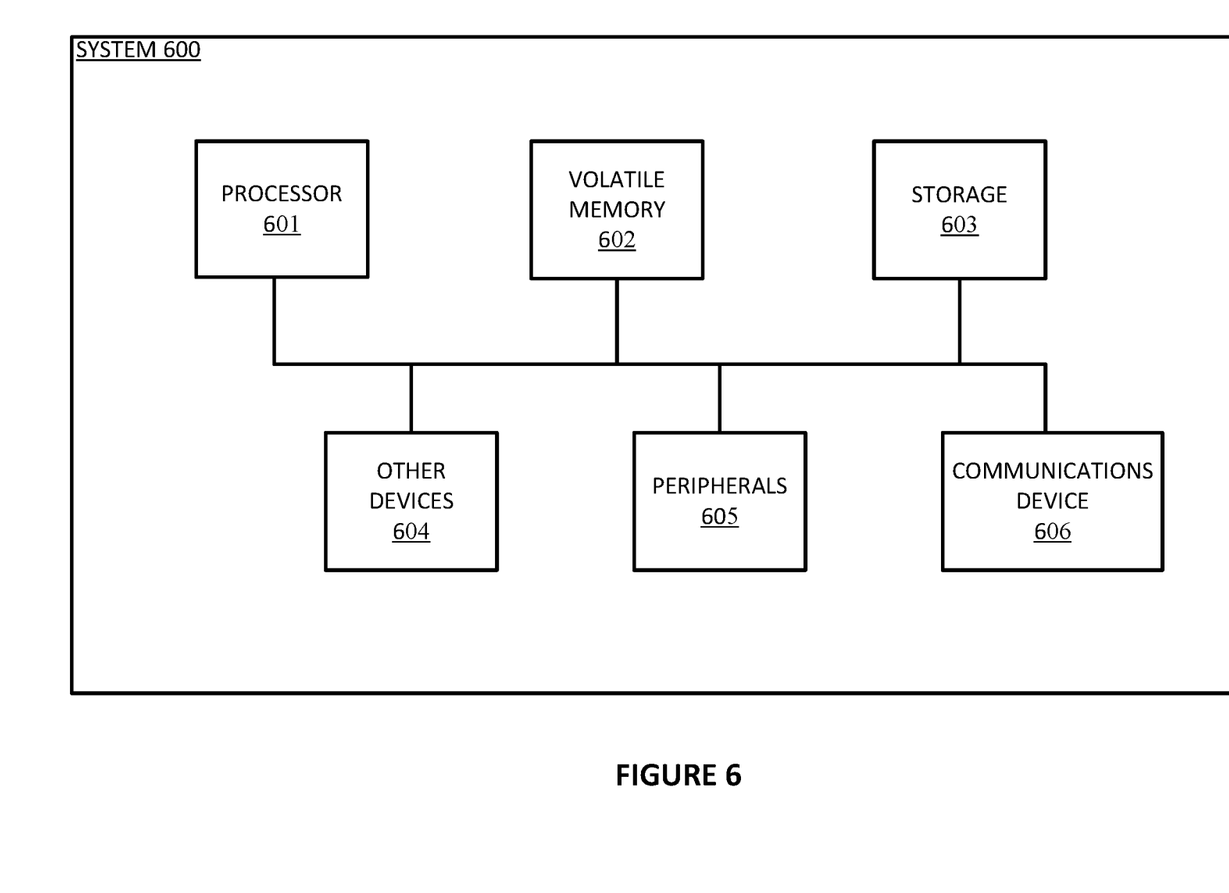
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 100 to an external medium. For example, communications device 606 may take the form of a network adapter that provides communications to a network. A computer 600 may also include a variety of other devices 604. The various components of the computer 600 may be connected by a connection medium such as a bus, crossbar, or network.

It will be appreciated that the present disclosure may include any one and up to all of the following examples.

Example 1: A method comprising: providing, for a physical space, a connection to a remote video conferencing session with one or more remote participants, the physical space comprising: one or more transparent video screens, one or more cameras each positioned behind a different one of the transparent screens, and one or more participants positioned in front of the transparent screens and cameras; providing a connection within the physical space to a remote video conferencing session with one or more remote participants; displaying, at each of the one or more transparent screens, streamed videos of the one or more remote participants in every other frame of the video such that each screen alternates between displaying a frame of the remote participant and a transparent frame, with each of the one or more transparent screens displaying a different remote participant; capturing, via the cameras, video frames of the one or more participants in the physical space during the display of the transparent frames; and transmitting the captured video frames of the participants to be displayed at one or more remote screens viewed by the one or more remote participants.

Example 2: The method of Example 1, further comprising: assigning each of the participants to a remote video screen with a known position located in a remote physical space associated with the remote participants; capturing a separate live audio recording of each of the participants; processing, in real time, each of the captured live audio recordings to be spatially positioned within a generated audio mix based on the assignment of the associated participant to the remote video screens and their known positions; transmitting the generated audio mix to be streamed for playback at the remote video conferencing session such that each of the spatially positioned captured live audio recordings is localized for playback within a spatial position corresponding to the known position of the associated remote video screen.

Example 3: The method of Example 2, wherein the processing of the captured live audio recordings utilizes spatial audio techniques.

Example 4: The method of any of Examples 2-3, wherein the capturing of the live audio recordings is performed via one or more of: the cameras, and one or more microphones in proximity to each of the transparent video screens.

Example 5: The method of any of Examples 2-4, wherein the spatial positioning within the generated audio mix is optimized for one or more of: stereo, multichannel surround sound, binaural audio, three-dimensional sound, Ambisonics, and 360 degree sound.

Example 6: The method of any of Examples 1-5, wherein the transparent video
screens are one of: a transparent OLED screen, and a transparent AMOLED screen.

Example 7: The method of any of Examples 1-6, further comprising: providing an indication to a server hosting the remote video conferencing session that a spatial configuration is to be employed within the physical space.

Example 8: The method of Example 7, further comprising: in response to providing the indication to the server that a spatial configuration is to be employed within the physical space, receiving the streamed videos of the remote participants for display, wherein the background of each of the remote participants has been removed from each of the streamed videos and replaced with a transparent background.

Example 9: The method of any of Examples 1-8, wherein the captured video frames to be transmitted are optimized for one or more of: multichannel video, spatial video, and 360 degree video.

Example 10: The method of any of Examples 1-9, further comprising: verifying, using one or more eye gaze tracking techniques, that the transparent video screens display the one or more remote participants such that eye contact of the remote participants is represented as being directed at the one or more participants.

Example 11: The method of any of Examples 1-10, further comprising: receiving, from the server, verification that the one or more participants are being displayed within a remote physical space associated with the remote video conferencing session such that eye contact of the participants is represented as being directed at the one or more remote participants.

Example 12: The method of any of Examples 1-11, wherein the transparent video screens and the cameras behind the transparent video screens are positioned equidistant to one another to cover a full view of the participants within the physical space.

Example 13: The method of any of Examples 1-12, wherein the display of the streamed videos of the remote participants utilizes one or more frame interpolation techniques.

Example 14: The method of any of Examples 1-13, further comprising: processing the captured video frames to optimize for remote real-time streaming playback.

Example 15: The method of any of Examples 1-14, wherein the one or more transparent video screens are configured to output video at a refresh rate of 120 hertz or greater.

Example 16: A non-transitory computer-readable medium containing instructions, comprising: instructions for providing, for a physical space, a connection to a remote video conferencing session with one or more remote participants, the physical space comprising: one or more transparent video screens, one or more cameras each positioned behind a different one of the transparent screens, and one or more participants positioned in front of the transparent screens and cameras; instructions for providing a connection within the physical space to a remote video conferencing session with one or more remote participants; instructions for displaying, at each of the one or more transparent screens, streamed videos of the one or more remote participants in every other frame of the video such that each screen alternates between displaying a frame of the remote participant and a transparent frame, with each of the one or more transparent screens displaying a different remote participant; instructions for capturing, via the cameras, video frames of the one or more participants in the physical space during the display of the transparent frames; and instructions for transmitting the captured video frames of the participants to be displayed at one or more remote screens viewed by the one or more remote participants.

Example 17: The non-transitory computer-readable medium of Example 16, further comprising: instructions for assigning each of the participants to a remote video screen with a known position located in a remote physical space associated with the remote participants; capturing a separate live audio recording of each of the participants; instructions for processing, in real time, each of the captured live audio recordings to be spatially positioned within a generated audio mix based on the assignment of the associated participant to the remote video screens and their known positions; instructions for transmitting the generated audio mix to be streamed for playback at the remote video conferencing session such that each of the spatially positioned captured live audio recordings is localized for playback within a spatial position corresponding to the known position of the associated remote video screen.

Example 18: The non-transitory computer-readable medium of Example 17, wherein the processing of the captured live audio recordings utilizes spatial audio techniques.

Example 19: The non-transitory computer-readable medium of any of Examples 17-18, wherein the capturing of the live audio recordings is performed via one or more of: the cameras, and one or more microphones in proximity to each of the transparent video screens.

Example 20: The non-transitory computer-readable medium of any of Examples 17-19, wherein the spatial positioning within the generated audio mix is optimized for one or more of: stereo, multichannel surround sound, binaural audio, three-dimensional sound, Ambisonics, and 360 degree sound.

Example 21: The non-transitory computer-readable medium of any of Examples 16-20, wherein the transparent video screens are one of: a transparent OLED screen, and a transparent AMOLED screen.

Example 22: The non-transitory computer-readable medium of any of Examples 16-21, further comprising: instructions for providing an indication to a server hosting the remote video conferencing session that a spatial configuration is to be employed within the physical space.

Example 23: The non-transitory computer-readable medium of Example 22, further comprising: in response to providing the indication to the server that a spatial configuration is to be employed within the physical space, instructions for receiving the streamed videos of the remote participants for display, wherein the background of each of the remote participants has been removed from each of the streamed videos and replaced with a transparent background.

Example 24: The non-transitory computer-readable medium of any of Examples 16-23, wherein the captured video frames to be transmitted are optimized for one or more of: multichannel video, spatial video, and 360 degree video.

Example 25: The non-transitory computer-readable medium of any of Examples 16-24, further comprising: instructions for verifying, using one or more eye gaze tracking techniques, that the transparent video screens display the one or more remote participants such that eye contact of the remote participants is represented as being directed at the one or more participants.

Example 26: The non-transitory computer-readable medium of any of Examples 16-25, further comprising: instructions for receiving, from the server, verification that the one or more participants are being displayed within a remote physical space associated with the remote video conferencing session such that eye contact of the participants is represented as being directed at the one or more remote participants.

Example 27: The non-transitory computer-readable medium of any of Examples 16-26, wherein the transparent video screens and the cameras behind the transparent video screens are positioned equidistant to one another to cover a full view of the participants within the physical space.

Example 28: The non-transitory computer-readable medium of any of Examples 16-27, wherein the display of the streamed videos of the remote participants utilizes one or more frame interpolation techniques.

Example 29: The non-transitory computer-readable medium of any of Examples 16-28, further comprising: instructions for processing the captured video frames to optimize for remote real-time streaming playback.

Example 30: The non-transitory computer-readable medium of any of Examples 16-29, wherein the one or more transparent video screens are configured to output video at a refresh rate of 120 hertz or greater.

Example 31: A system comprising one or more processors configured to perform the operations of: providing, for a physical space, a connection to a remote video conferencing session with one or more remote participants, the physical space comprising: one or more transparent video screens, one or more cameras each positioned behind a different one of the transparent screens, and one or more participants positioned in front of the transparent screens and cameras; providing a connection within the physical space to a remote video conferencing session with one or more remote participants; displaying, at each of the one or more transparent screens, streamed videos of the one or more remote participants in every other frame of the video such that each screen alternates between displaying a frame of the remote participant and a transparent frame, with each of the one or more transparent screens displaying a different remote participant; capturing, via the cameras, video frames of the one or more participants in the physical space during the display of the transparent frames; and transmitting the captured video frames of the participants to be displayed at one or more remote screens viewed by the one or more remote participants.

Example 32: The system of Example 31, further comprising: assigning each of the participants to a remote video screen with a known position located in a remote physical space associated with the remote participants; capturing a separate live audio recording of each of the participants; processing, in real time, each of the captured live audio recordings to be spatially positioned within a generated audio mix based on the assignment of the associated participant to the remote video screens and their known positions; transmitting the generated audio mix to be streamed for playback at the remote video conferencing session such that each of the spatially positioned captured live audio recordings is localized for playback within a spatial position corresponding to the known position of the associated remote video screen.

Example 33: The system of Example 32, wherein the processing of the captured live audio recordings utilizes spatial audio techniques.

Example 34: The system of any of Examples 32-33, wherein the capturing of the live audio recordings is performed via one or more of: the cameras, and one or more microphones in proximity to each of the transparent video screens.

Example 35: The system of any of Examples 32-34, wherein the spatial positioning within the generated audio mix is optimized for one or more of: stereo, multichannel surround sound, binaural audio, three-dimensional sound, Ambisonics, and 360 degree sound.

Example 36: The system of any of Examples 31-35, wherein the transparent video screens are one of: a transparent OLED screen, and a transparent AMOLED screen.

Example 37: The system of any of Examples 31-36, further comprising: providing an indication to a server hosting the remote video conferencing session that a spatial configuration is to be employed within the physical space.

Example 38: The system of Example 37, further comprising: in response to providing the indication to the server that a spatial configuration is to be employed within the physical space, receiving the streamed videos of the remote participants for display, wherein the background of each of the remote participants has been removed from each of the streamed videos and replaced with a transparent background.

Example 39: The system of any of Examples 31-38, wherein the captured video frames to be transmitted are optimized for one or more of: multichannel video, spatial video, and 360 degree video.

Example 40: The system of any of Examples 31-39, further comprising: verifying, using one or more eye gaze tracking techniques, that the transparent video screens display the one or more remote participants such that eye contact of the remote participants is represented as being directed at the one or more participants.

Example 41: The system of any of Examples 31-40, further comprising: receiving, from the server, verification that the one or more participants are being displayed within a remote physical space associated with the remote video conferencing session such that eye contact of the participants is represented as being directed at the one or more remote participants.

Example 42: The system of any of Examples 31-41, wherein the transparent video screens and the cameras behind the transparent video screens are positioned equidistant to one another to cover a full view of the participants within the physical space.

Example 43: The system of any of Examples 31-42, wherein the display of the streamed videos of the remote participants utilizes one or more frame interpolation techniques.

Example 44: The system of any of Examples 31-43, further comprising: processing the captured video frames to optimize for remote real-time streaming playback.

Example 45: The system of any of Examples 31-44, wherein the one or more transparent video screens are configured to output video at a refresh rate of 120 hertz or greater.

In an aspect, a method may include enabling a connection to a remote video conferencing session. The method may include transmitting an indication to employ a spatial configuration within a physical space for the remote video conferencing session. The method may include displaying, at a transparent screen, a video stream of interpolated frames of a remote participant and a transparent frame. The method may include capturing, via a camera positioned behind the transparent screen, video frames of a participant in the physical space when the transparent frame is displayed. The method may include transmitting the captured video frames of the participant for display at a remote screen.

In an aspect, a non-transitory computer-readable medium may include instructions, that when executed by a processor, cause the processor to perform operations. The operations may include enabling a connection to a remote conferencing session. The operations may include transmitting an indication to employ a spatial configuration within a physical space for the remote video conferencing session. The operations may include displaying, at a transparent screen, a video stream of interpolated frames of a remote participant and a transparent frame. The operations may include capturing, via a camera positioned behind the transparent screen, video frames of a participant in the physical space when the transparent frame is displayed. The operations may include transmitting the captured video frames of the participant for display at a remote screen.

In an aspect, a system may include a server, a transparent screen, and a camera. The server may be configured to enable a connection to a remote video conferencing session and transmit an indication to employ a spatial configuration within a physical space for the remote video conferencing session. The transparent screen may be configured to display a video stream of interpolated frames of a remote participant and a transparent frame. The camera may be positioned behind the transparent screen and configured to capture video frames of a participant in the physical space when the transparent frame is displayed. The server may be configured to transmit the captured video frames of the participant for display at a remote screen.

In one or more aspects, the participant may be assigned to a remote video screen with a position located in a remote physical space associated with the remote participant. In one or more aspects, a separate live audio recording of the participant may be captured. In one or more aspects, the captured live audio recording may be processed in real time to be spatially positioned within a generated audio mix based on the assignment of the participant to the remote video screen and the position. In one or more aspects, the generated audio mix may be transmitted for streamed playback at the remote video conferencing session such that the spatially positioned captured live audio recording is localized for playback within a spatial position corresponding to the position of the associated remote video screen. In one or more aspects, the processing of the captured live audio recording may utilize spatial audio techniques. In one or more aspects, the capturing of the live audio recordings may be performed via one or more of the camera or one or more microphones in proximity to the transparent video screen. In one or more aspects, the spatial positioning within the generated audio mix may be optimized for one or more of stereo, multichannel surround sound, binaural audio, three-dimensional sound, Ambisonics, and 360 degree sound. In one or more aspects, the transparent video screen may be a transparent OLED screen or a transparent AMOLED screen. In one or more aspects, the indication to employ a spatial configuration may be transmitted to a server hosting the remote video conferencing session. In one or more aspects, responsive to transmitting the indication to the server to employ a spatial configuration, the video stream of the remote participant may be received for display, wherein a background of the remote participant has been removed from the video stream and replaced with a transparent background. In one or more aspects, the captured video frames may be transmitted and optimized for one or m ore of multichannel video, spatial video, and 360 degree video. In one or more aspects, the transparent screen displays of the remote participant may be verified such that a representation of eye contact of the remote participant is directed at the participant. In one or more aspects, a verification may be received from a server that the participant is displayed within a remote physical space associated with the remote video conferencing session such that a representation of eye contact of the participant is directed at the remote participant. In one or more aspects, the display of the video stream of the remote participant may be alternated between a remote participant frame and a transparent frame at every other frame. In one or more aspects, the captured video frames may be optimized for remote real-time streaming playback. In one or more aspects, the transparent screen may be configured to output video at a refresh rate of 120 hertz or greater. In one or more aspects, the spatial configuration may represent one or more spatialized separations in the physical space between positions of two or more of at least one participant, at least one camera, and at least one transparent screen.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
enabling a connection to a remote video conferencing session;
transmitting an indication to employ a spatial configuration within a physical space for the remote video conferencing session;
receiving a video stream of interpolated frames of a remote participant frame and a transparent frame;
removing a background of the remote participant frame from the video stream;
displaying, at a transparent screen, the video stream;
capturing, via a camera positioned behind the transparent screen, video frames of a participant in the physical space when the transparent frame is displayed; and
transmitting the captured video frames of the participant for display at a remote screen.

2. The method of claim 1, further comprising:
assigning the participant to a remote video screen with a position located in a remote physical space associated with a remote participant;
capturing a separate live audio recording of the participant;
processing, in real time, the captured live audio recording to be spatially positioned within a generated audio mix based on the assignment of the participant to the remote video screen and the position; and
transmitting the generated audio mix for streamed playback at the remote video conferencing session such that the spatially positioned captured live audio recording is localized for playback within a spatial position corresponding to the position of the associated remote video screen.

3. The method of claim 2, wherein the processing of the captured live audio recording utilizes spatial audio techniques.

4. The method of claim 2, wherein the capturing of the live audio recordings is performed via one or more of: the camera, and one or more microphones in proximity to the transparent video screen.

5. The method of claim 2, wherein the spatial positioning within the generated audio mix is optimized for one or more of: stereo, multichannel surround sound, binaural audio, three-dimensional sound, Ambisonics, and 360 degree sound.

6. The method of claim 1, wherein the transparent video screen is a transparent organic light-emitting diode (OLED) screen or a transparent active-matrix organic light-emitting diode (AMOLED) screen.

7. The method of claim 1, further comprising:
transmitting the indication to employ a spatial configuration to a server hosting the remote video conferencing session.

8. The method of claim 1,
wherein the background of the remote participant is replaced with a transparent background.

9. The method of claim 1, wherein the captured video frames to be transmitted are optimized for one or more of: multichannel video, spatial video, and 360 degree video.

10. The method of claim 1, further comprising:
verifying that the transparent screen displays the remote participant such that a representation of eye contact of a remote participant is directed at the participant.

11. The method of claim 1, further comprising:
receiving, from a server, verification that the participant is displayed within a remote physical space associated with the remote video conferencing session such that a representation of eye contact of the participant is directed at a remote participant.

12. The method of claim 1, wherein the display of the video stream of a remote participant alternates between the remote participant frame and the transparent frame at every other frame.

13. The method of claim 1, further comprising:
processing the captured video frames to optimize for remote real-time streaming playback.

14. The method of claim 1, wherein the transparent screen is configured to output video at a refresh rate of 120 hertz or greater.

15. A non-transitory computer-readable medium containing instructions, that when executed by a processor, cause the processor to perform operations including:
enabling a connection to a remote video conferencing session;

transmitting an indication to employ a spatial configuration within a physical space for the remote video conferencing session;
receiving a video stream of interpolated frames of a remote participant frame and a transparent frame;
removing a background of the remote participant frame from the video stream;
displaying, at a transparent screen, the video stream;
capturing, via a camera positioned behind the transparent screen, video frames of a participant in the physical space when the transparent frame is displayed; and
transmitting the captured video frames of the participant for display at a remote screen.

16. The non-transitory computer-readable medium of claim 15, wherein the processor is further configured to perform operations including:
assigning the participant to a remote video screen with a position located in a remote physical space associated with a remote participant;
capturing a separate live audio recording of the participant;
processing, in real time, the captured live audio recording to be spatially positioned within a generated audio mix based on the assignment of the participant to the remote video screen and the position; and
transmitting the generated audio mix for streamed playback at the remote video conferencing session such that the spatially positioned captured live audio recording is localized for playback within a spatial position corresponding to the position of the associated remote video screen.

17. The non-transitory computer-readable medium of claim 15, wherein the processor is further configured to perform operations including:
transmitting the indication to employ a spatial configuration to a server hosting the remote video conferencing session.

18. A system, comprising:
a server configured to enable a connection to a remote video conferencing session and transmit an indication to employ a spatial configuration within a physical space for the remote video conferencing session;
a transparent screen configured to:
receive a video stream of interpolated frames of a remote participant frame and a transparent frame;
remove a background of the remote participant frame from the video stream; and
display the video stream; and
a camera positioned behind the transparent screen and configured to capture video frames of a participant in the physical space when the transparent frame is displayed; and
the server further configured to transmit the captured video frames of the participant for display at a remote screen.

19. The system of claim 18, wherein the server is further configured to:
assign the participant to a remote video screen with a position located in a remote physical space associated with a remote participant;
capture a separate live audio recording of the participant;
process, in real time, the captured live audio recording to be spatially positioned within a generated audio mix based on the assignment of the participant to the remote video screen and the positions; and
transmit the generated audio mix for streamed playback at the remote video conferencing session such that the spatially positioned captured live audio recording is localized for playback within a spatial position corresponding to the position of the associated remote video screen.

20. The system of claim 18, wherein the spatial configuration represents one or more spatialized separations in the physical space between positions of two or more of: at least one participant, at least one camera, and at least one transparent screen.

* * * * *